United States Patent
Fichtinger et al.

(10) Patent No.: US 10,875,480 B2
(45) Date of Patent: Dec. 29, 2020

(54) BUMPER ARRANGEMENT FOR THE FRONT REGION OF A PASSENGER CAR

(71) Applicant: Bayerische Motoren Werke Aktiengesellschaft, Munich (DE)

(72) Inventors: Gerhard Fichtinger, Grasbrunn (DE); Martin Gross, Ottershausen Haimhausen (DE); Mazdak Novine, Munich (DE); Tim Rudolph, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 32 days.

(21) Appl. No.: 16/448,631

(22) Filed: Jun. 21, 2019

(65) Prior Publication Data
US 2019/0308578 A1   Oct. 10, 2019

Related U.S. Application Data

(63) Continuation of application No. PCT/EP2017/084003, filed on Dec. 21, 2017.

(30) Foreign Application Priority Data

Dec. 22, 2016   (DE) .................. 10 2016 226 096

(51) Int. Cl.
*B60R 19/28*   (2006.01)
*B60R 19/12*   (2006.01)
(Continued)

(52) U.S. Cl.
CPC .............. *B60R 19/28* (2013.01); *B60R 19/12* (2013.01); *B60R 21/34* (2013.01); *B60R 19/40* (2013.01); *B60R 2021/343* (2013.01)

(58) Field of Classification Search
CPC .......... B60R 19/12; B60R 19/18; B60R 19/28
See application file for complete search history.

(56) References Cited

U.S. PATENT DOCUMENTS

| 4,542,925 A | 9/1985 | Huber et al. |
| 2004/0144522 A1* | 7/2004 | Bauer .................... B60R 19/12 165/67 |

(Continued)

FOREIGN PATENT DOCUMENTS

| DE | 101 00 875 A1 | 7/2002 |
| DE | 101 37 911 A1 | 1/2003 |

(Continued)

OTHER PUBLICATIONS

International Search Report (PCT/ISA/210) issued in PCT Application No. PCT/EP2017/084001 dated Mar. 2, 2018 with English translation (six (6) pages).

(Continued)

*Primary Examiner* — Joseph D. Pape
(74) *Attorney, Agent, or Firm* — Crowell & Moring LLP

(57) ABSTRACT

A bumper arrangement of a passenger car has an upper and a lower load path. A spring element is provided on the transverse support of the lower load path, which, in the event of a collision of a pedestrian with the passenger car, exerts an additional force on the lower leg of the pedestrian, so as to support the movement of the pedestrian in the direction of the front hood of the passenger car.

16 Claims, 2 Drawing Sheets

(51) Int. Cl.
    *B60R 21/34*    (2011.01)
    *B60R 19/40*    (2006.01)

(56) References Cited

U.S. PATENT DOCUMENTS

| | | |
|---|---|---|
| 2011/0227353 A1 | 9/2011 | Nagwanshi et al. |
| 2012/0161473 A1 | 6/2012 | Schaefer |
| 2015/0158445 A1 | 6/2015 | Sogabe et al. |
| 2019/0161038 A1* | 5/2019 | Grattan ................ B62D 21/152 |

FOREIGN PATENT DOCUMENTS

| | | |
|---|---|---|
| DE | 102 32 321 A1 | 2/2004 |
| DE | 10 2004 030 794 A1 | 1/2006 |
| DE | 10 2008 038 062 B3 | 6/2010 |
| DE | 10 2010 056 390 A1 | 6/2012 |
| DE | 10 2014 016 044 A1 | 5/2016 |
| EP | 1 273 483 A2 | 1/2003 |
| WO | WO 2014/154630 A1 | 10/2014 |
| WO | WO 2016/189140 A1 | 12/2016 |

OTHER PUBLICATIONS

German-language Written Opinion (PCT/ISA/237) issued in PCT Application No. PCT/EP2017/084001 dated Mar. 2, 2018 (five (5) pages).

German-language Search Report issued in counterpart German Application No. 102016226093.6 dated Oct. 24, 2017 with partial English translation (14 pages).

International Search Report (PCT/ISA/210) issued in PCT Application No. PCT/EP2017/084003 dated Mar. 3, 2018 with English translation (four (4) pages).

German-language Written Opinion (PCT/ISA/237) issued in PCT Application No. PCT/EP2017/084003 dated Mar. 3, 2018 (five (5) pages).

German-language Search Report issued in counterpart German Application No. 102016226096.0 dated Oct. 27, 2017 with partial English translation (14 pages).

* cited by examiner

BUMPER ARRANGEMENT FOR THE FRONT REGION OF A PASSENGER CAR

CROSS REFERENCE TO RELATED APPLICATIONS

This application is a continuation of PCT International Application No. PCT/EP2017/084003, filed Dec. 21, 2017, which claims priority under 35 U.S.C. § 119 from German Patent Application No. 10 2016 226 096.0, filed Dec. 22, 2016, the entire disclosures of which are herein expressly incorporated by reference.

This application contains subject matter related to U.S. application Ser. No. 16/448,645, entitled "Bumper Arrangement for the Front Region of a Passenger Car" filed on even date herewith, the entire disclosure of which is incorporated by reference herein.

BACKGROUND AND SUMMARY OF THE INVENTION

The invention relates to a bumper arrangement for the front region of a passenger car and to a passenger car having such a bumper arrangement.

A bumper arrangement of the type in question is known for example from WO 2014/154630 A1. The known bumper arrangement has an upper and a lower load path. The upper load path is formed by upper longitudinal members and an upper crossmember and, in the event of a collision of the passenger car, bears the main part of the energy reduction. The lower load path is formed by lower longitudinal members and a lower crossmember. The lower crossmember is usually also known as a "lower stiffener" or as a "lower bumper stiffener". The two crossmembers are covered by a bumper cover. The lower crossmember serves to stiffen the bumper cover in its lower region in particular when subjected to a force by a pedestrian as a result of an accident. In the event of a pedestrian's lower leg colliding with the bumper cover, the lower crossmember causes the pedestrian to be moved onto the hood of the passenger vehicle in a manner accelerated by an appropriate force and thus in a defined manner in the region of his lower leg.

The object of the invention is to further develop the known bumper arrangement.

This and other objects are achieved by a bumper arrangement, and a vehicle having the same, for the front region of a passenger car, having an upper load path, which has upper longitudinal members and an upper crossmember, and having a lower load path, which has lower longitudinal members and a lower crossmember. At least one spring element that is supported on the lower longitudinal member with a first end portion is provided in the connection region of the lower longitudinal member to the lower crossmember. A device is provided, with which, in the event of a collision of the passenger car, the direct connection between the lower longitudinal member and the lower crossmember is undoable. After the direct connection between the lower longitudinal member and the lower cross member has been undone, the spring element forms the support for the crossmember with a second end portion.

By providing at least one spring element in the lower load path in each case in the connection region of the lower longitudinal member to the lower crossmember, the spring elements have the effect that, in the event of a collision of the passenger car with a pedestrian, the pedestrian is deflected optimally in the direction of the hood of the passenger car. In the event of a collision, the pedestrian's torso is displaced in the direction of the hood. This inclined position of the torso is not followed to the same extent by the legs and, in particular, the lower legs of the pedestrian. The spring elements create a "rebound" according to the invention, with the result that the lower legs of the pedestrian are subjected to a force in the direction of travel of the passenger car and thus, in accordance with the inclined position of the torso, the lower legs are made to "follow suit".

The connection regions of the lower longitudinal members to the lower crossmember are the front end portions of the lower longitudinal members or are deformation elements, known as "defoboxes", provided at the front end portions of the lower longitudinal members. For reasons of linguistic simplification, in principle, whenever the expression "lower longitudinal member" is used in connection with the present patent application, the alternative of a deformation element arranged at the front end portion of the lower longitudinal member is also encompassed equally. Such deformation elements serve for energy reduction in that, in the event of a collision, they plastically deform before plastic deformation of the longitudinal member occurs.

Preferably, two spring elements are provided, which are arranged on the right and left, in each case in the connection region of the lower longitudinal members to the lower crossmember, such that, in the event of a collision, spring-elastic support of the entire lower crossmember with respect to the lower longitudinal members and thus with respect to the support structure of the passenger car is achieved with only two spring elements. Depending on whether the collision of the passenger car with the pedestrian occurs in the central region or in the region of a lateral end portion of the lower crossmember, both spring elements can support the crossmember in this case, or the support is provided only by one of the two spring elements.

In an advantageous configuration of the invention, the device for undoing the direct connection has at least one component that has a predetermined breaking point, such that, in the event of a collision, when a predetermined force level is exceeded, the component fails and the direct connection between the lower longitudinal member and lower crossmember is automatically undone. This embodiment is characterized by very high functional reliability and low costs. An additional energy source for actuating the component is not required. The failure of the component with the predetermined breaking point is designed for the collision with a pedestrian and for the force level that is achieved in standardized tests, for example with what is known as a FLEX-PLI ("Flexible Pedestrian Legform Impactor"). By contrast, the component with the predetermined breaking point is not intended to fail in the event of parking knocks and the like.

Of course, it is possible, rather than a component with a predetermined breaking point, to provide for example a pyrotechnically acting element or an electrically actuable element for undoing the connection, for example an electromagnetically movable locking bolt.

By way of example, the device for undoing the direct connection of the lower crossmember to the lower longitudinal member is in the form of a shear bolt that connects the lower longitudinal member (or the deformation element) to the lower crossmember unless, in the event of a collision, the connection is undone by the shear bolt breaking off and the lower crossmember can be supported on the spring element.

In a preferred configuration of the invention, the spring elements are embodied in a compressible manner, such that, in the event of a collision, when the spring elements are compressed, an additional deformation travel is available.

This applies equally for spring elements with and without pretension, wherein, in the case of pretensioned spring elements, the available deformation travel may be somewhat reduced. As a result of the compression of the spring element, the latter absorbs additional spring energy.

According to one development of the invention, in order to limit the deformation travel, i.e. the distance by which the lower crossmember plunges counter to the direction of travel, a stop is provided on the lower longitudinal member. As soon as the stop is reached, the compressed spring element releases the absorbed energy again, with the result that the lower crossmember is accelerated forward in the direction of travel and thus a "rebound" that is as good as possible is exerted on the pedestrian's lower leg.

During normal operation of the passenger car (that is to say without the action of a force as a result of a collision), the spring elements can be relaxed or pretensioned. In the case of pretensioned spring elements, in the event of a collision, the energy stored in the spring elements is additionally available, in order to enhance the above-described advantageous effect with regard to the displacement of a pedestrian.

The arrangement, proposed in one configuration of the invention, of the spring elements in the interior of the lower longitudinal member is characterized by a particularly small space requirement. As already explained above, this is equivalent to the arrangement of the spring elements in the interior of deformation elements ("defoboxes") that are arranged in each case at the front end portions of the lower longitudinal members.

The spring elements can consist of plastic or metal or of a combination of both materials. In one advantageous configuration of the invention, the spring elements are in the form of coil springs, and are thus cost-effective, functionally reliable and space-saving.

A passenger car having a bumper arrangement according to the invention is also disclosed.

All location information (for example front, rear) used herein relates to the direction of travel of the passenger car when traveling forward.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
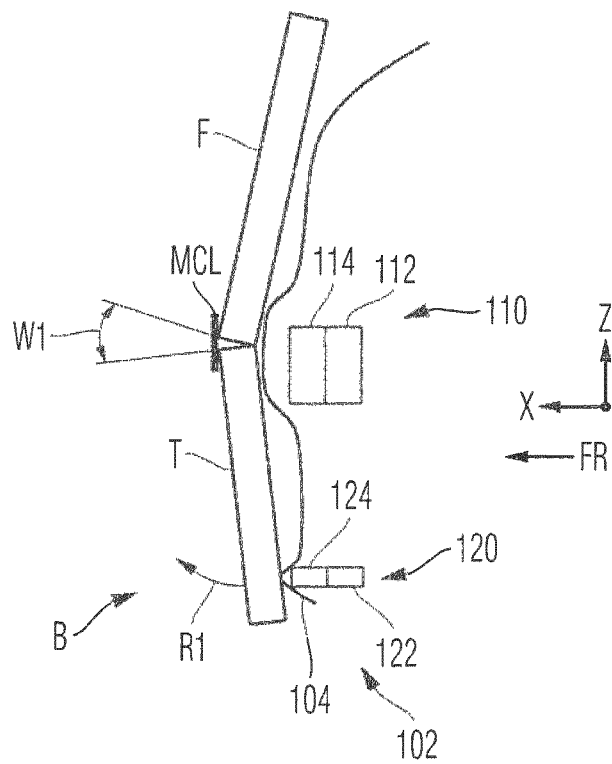
FIG. 1 is a schematic illustration of a bumper arrangement in longitudinal section, according to the prior art.

In the drawings, the direction of travel is labeled FR and a coordinate system with the spatial directions X (vehicle longitudinal direction), Y (vehicle transverse direction) and Z (vehicle vertical axis) is indicated. The X direction extends parallel to the direction of travel FR.

FIG. 1 shows the front region of a passenger car having a bumper arrangement 102 according to the prior art. The known bumper arrangement 102 has an upper and a lower load path 110 and 120, respectively, with an upper and a lower crossmember 112 and 122, respectively. The bumper arrangement 102 is covered by a front cover 104. Provided on the front side of the upper crossmember 112 is a cushion 114 made of energy-reducing absorbent foam. The lower crossmember 122 also has at the front an energy-absorbing cushion or insert 124. This can be for example a foam material or a cushion with a plastically deformable rib structure.

FIG. 1 simulates a collision situation of the passenger car with a pedestrian, using a legform impactor B, for example what is known as a FLEX-PLI ("Flexible Pedestrian Legform Impactor"). The legform impactor B symbolizes a pedestrian who is looking transversely to the direction of travel FR. Illustrated on the legform impactor B is a medial collateral ligament MCL and an opening angle W1 between the lower leg T and thigh F. The arrow R1 describes the amount of displacement of the lower leg T after impacting the front cover 102 in the region of the lower crossmember 112. Because of the plastic deformation of the energy-absorbing cushion 124, the lower leg T is not appreciably displaced in the same direction of rotation as the thigh F. As a result, a comparatively large opening angle W1 arises at the knee and thus a comparatively great extension of the medial collateral ligament MCL.

Figure 2:
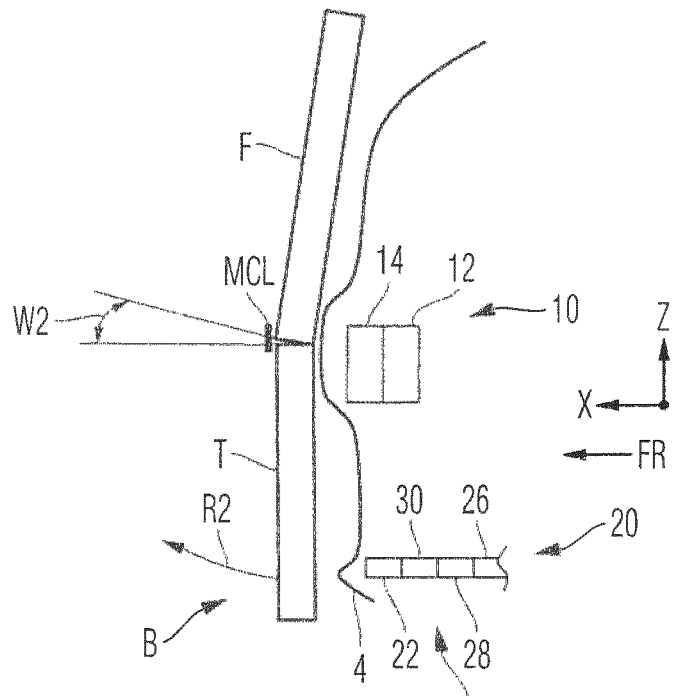
FIG. 2 is a schematic illustration, corresponding to FIG. 1, of an embodiment of the invention.

FIG. 2 shows a front region according to an embodiment of the invention of a passenger car having a bumper arrangement 2, with an upper and a lower load path 10 and 20, respectively. The upper load path 10 is formed by upper longitudinal members (not illustrated) and an upper crossmember 12. The lower load path 20 is formed by lower longitudinal members 26 and a lower crossmember 22. The bumper arrangement 2 is covered by a front cover 4. Provided on the front side of the upper crossmember 12 is a cushion 14 made of an energy-reducing absorbent foam. A spring element 30 is arranged between the lower crossmember 22 and a deformation element 28. The deformation elements 28 are connected in front of the lower longitudinal members 26 or integrated in the front end portions of the lower longitudinal members 26. In the event of a collision, they reduce kinetic energy by plastic deformation.

FIG. 2 also illustrates a simulated collision situation of the passenger car with a pedestrian, using a legform impactor B. In contrast to the collision situation in FIG. 1, however, the lower crossmember 22 with the spring element 30 generates a force in the direction of travel FR, which causes the lower leg T to be displaced forward (in the direction of travel FR). This displacement is symbolized by an arrow R2. With the enhanced "rebound" of the bumper arrangement 2, the lower leg T follows the movement of a pedestrian's torso (not simulated on the legform impactor B) in the direction of the hood of the passenger car in the event of an actual collision. Thus, the opening angle W2 is smaller than in an equivalent collision situation with a bumper arrangement 102 according to the prior art, with less extension of the medial collateral ligament MCL.

Figure 3:
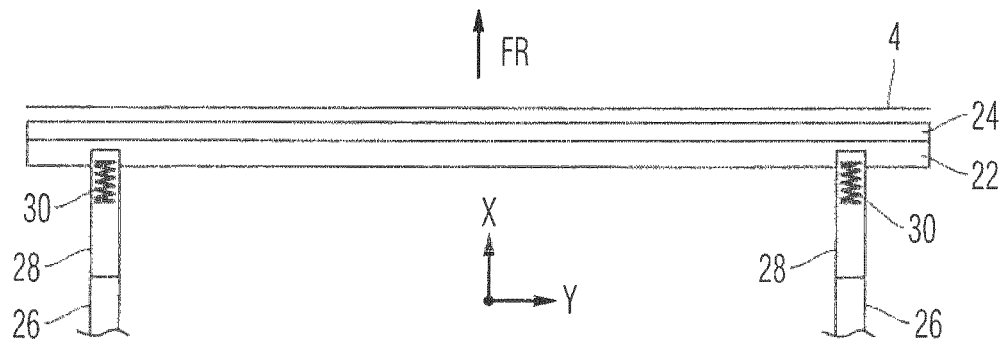
FIG. 3 is a schematic illustration of the embodiment of the invention in plan view.

FIG. 3 shows the lower crossmember 22 in a schematic illustration in plan view. Arranged on the front side of the lower crossmember 22 is an insert 24 that extends across the entire width of the crossmember 22 and almost completely fills the intermediate space between the inner side of the front cover 4 and the front side of the lower crossmember 22. The insert 24 serves to reduce collision energy by elastic and/or plastic deformation. The insert 24 is made for example of a plastics material. The insert 24 can be formed by a foam-like material. Arranged between the rear side of the lower crossmember 22 and the right-hand and the left-hand deformation element 28 are the spring elements 30. In this case, it is advantageous, as illustrated schematically in FIG. 3, to arrange the spring elements 30 in a space-saving manner in the interior of the deformation elements 28.

Figure 4:
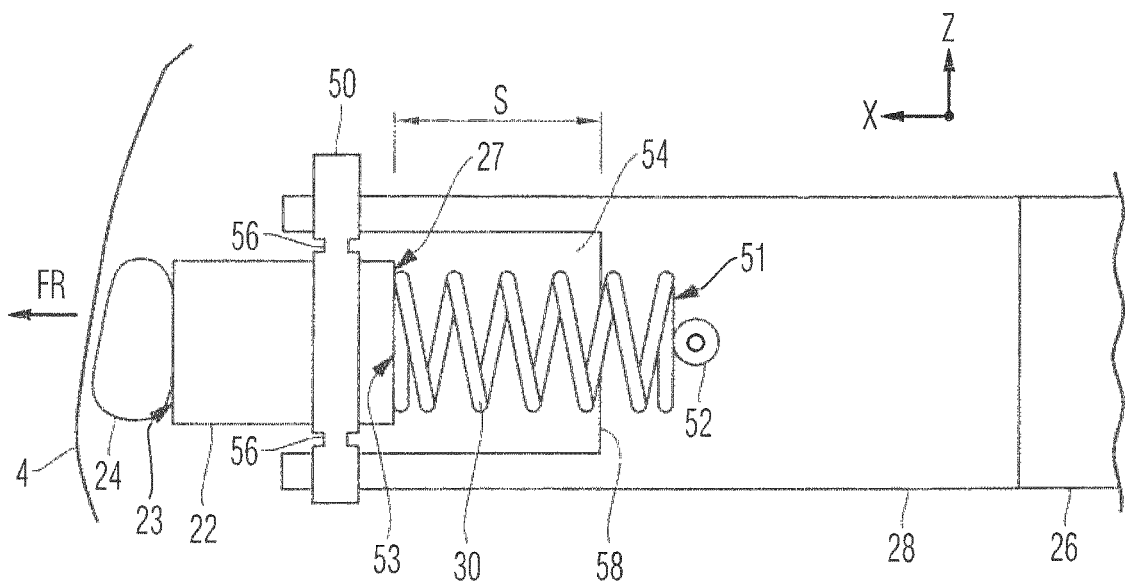
FIG. 4 is a schematic sectional illustration of the embodiment of the invention.

FIG. 4 shows the bumper arrangement in the region of the lower load path 20 in section. The lower longitudinal member 26 with its front-side deformation element 28 is connected firmly to the lower crossmember 22 via a shear bolt 50. The shear bolt 50 consists for example of a plastics material. The spring element 30 is in the form of a coil spring and secured to the deformation element 28 at a first (rear) end portion 51 by means of a support 52. The second (front) end portion 53 of the spring element 30 bears in a pretensioned manner against the rear side 27 of the lower crossmember 22. However, given the connection of the lower crossmember 22 to the deformation element 28 by means of the shear bolt 50, this pretension has no effect during normal operation of the passenger car. Alternatively, the spring element 30 can also be employed without or without significant pretension. Arranged on the front side 23 of the lower crossmember 22 is the insert 24, which almost completely fills the intermediate space up to the front cover 4.

Provided in the deformation element 28 is a fork-like clearance 54 for displacement of the crossmember 22 counter to the direction of travel FR. This displacement occurs according to the invention in the event of a collision when a predetermined force level is exceeded and the shear bolt 50 breaks at its predetermined breaking points 56 under the action of the collision force. The predetermined breaking points 56 are in the form of reductions in cross section in the shank of the shear bolt 50. The force level from which the shear bolt 50 fails is adapted to the forces that arise in the event of a collision with a pedestrian. Once this force level has been exceeded, the shear bolt 50 breaks, and so the force acting on the pedestrian's lower leg T is limited in that an additional deformation travel S is now available, since, after the breaking off of the shear bolt 50, the lower crossmember 22 can move toward the rear counter to the direction of travel FR under the load of the collision, until the spring element 30 forms a solid block and/or the end wall 58 of the clearance 54 forms a stop.

Once this maximum intrusion has been reached, as the collision continues, the energy stored in the spring element 30 on account of the preceding collision-related compression (and possibly on account of the pretension already applied in the normal position of the spring element 30 according to FIG. 4) is released. As a result, the lower crossmember 22 and thus the front cover experiences a "rebound", with the result that the pedestrian's lower leg T is subjected to a force in the direction of travel FR of the passenger car. The spring stiffness of the spring element 30 and optionally the pretension thereof are in this case adapted to an optimum "rebound".

In order to further understand the invention, reference may be made to Applicant's U.S. application Ser. No. 16/448,645, incorporated by reference above.

The invention can be summarized as follows: a bumper arrangement 2 of a passenger car has an upper and a lower load path 10 and 20, respectively. Provided according to the invention on the crossmember 22 of the lower load path 20 is a spring element 30, which, in the event of a collision of a pedestrian with the passenger car, exerts an additional force on the pedestrian's lower leg T in order to support the movement of the pedestrian in the direction of the hood of the passenger car.

LIST OF REFERENCE SIGNS

2 Bumper arrangement
4 Front cover
10 Upper load path
12 Upper crossmember
14 Cushion
16 Upper longitudinal member
20 Lower load path
22 Lower crossmember
23 Front side
24 Insert
26 Lower longitudinal member
27 Rear side
28 Deformation element
30 Spring element
50 Shear bolt
51 First end portion
52 Support
53 Second end portion
54 Clearance
56 Predetermined breaking point
58 End wall
102 Bumper arrangement
104 Front cover
110 Upper load path
112 Upper crossmember
114 Cushion
120 Lower load path
122 Lower crossmember
124 Cushion
B Legform impactor
F Thigh
FR Direction of travel
K2 Arrow
K3 Arrow
MCL Medial collateral ligament
R1 Arrow
R2 Arrow
S Deformation travel
T Lower leg
W1 Opening angle
W2 Opening angle
X, Y, Z Spatial direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bumper arrangement for a front region of a passenger car, comprising:
   an upper load path having upper longitudinal members and an upper crossmember;
   a lower load path having lower longitudinal members and a lower crossmember;
   at least one spring element supported on a lower longitudinal member, the spring element having a first end portion provided in a connection region of the lower longitudinal member to the lower crossmember;
   an uncoupling device with which, in an event of a collision of the passenger car, a direct connection between the lower longitudinal member and the lower crossmember is undonable, wherein after the direct connection between the lower longitudinal member and the lower cross member is undone, the spring element forms a support for the lower crossmember with a second end portion of the spring element.

2. The bumper arrangement according to claim 1, wherein the uncoupling device for undoing the direct connection between the lower longitudinal member and the lower crossmember comprises at least one component configured with a predetermined breaking point.

3. The bumper arrangement according to claim 2, wherein the uncoupling device is a shear bolt.

4. The bumper arrangement according to claim 1, wherein in the event of a collision, the spring element allows the lower crossmember to move counter to a direction of travel.

5. The bumper arrangement according to claim 4, wherein the spring element and/or the lower longitudinal member form a stop for the movement of the lower crossmember counter to the direction of travel.

6. The bumper arrangement according to claim 1, wherein the spring element is pretensioned during normal operation of the passenger car.

7. The bumper arrangement according to claim 1, wherein the spring element is arranged in an interior of the lower longitudinal member or in an interior of a deformation element provided on the lower longitudinal member.

8. The bumper arrangement according to claim 1, wherein the spring element is a coil spring.

9. A passenger car comprising a bumper arrangement according to claim 1.

10. The passenger car according to claim 9, wherein the uncoupling device for undoing the direct connection between the lower longitudinal member and the lower crossmember comprises at least one component configured with a predetermined breaking point.

11. The passenger car according to claim 10, wherein the uncoupling device is a shear bolt.

12. The passenger car according to claim 9, wherein in the event of a collision, the spring element allows the lower crossmember to move counter to a direction of travel.

13. The passenger car according to claim 12, wherein the spring element and/or the lower longitudinal member form a stop for the movement of the lower crossmember counter to the direction of travel.

14. The passenger car according to claim 9, wherein the spring element is pretensioned during normal operation of the passenger car.

15. The passenger car according to claim 9, wherein the spring element is arranged in an interior of the lower longitudinal member or in an interior of a deformation element provided on the lower longitudinal member.

16. The passenger car according to claim 9, wherein the spring element is a coil spring.

* * * * *